Oct. 29, 1957 C. G. SONTHEIMER 2,811,639

SIGNAL GENERATING APPARATUS

Filed May 26, 1953 2 Sheets-Sheet 1

INVENTOR
CARL G. SONTHEIMER
BY
Curtis, Morris & Safford.
ATTORNEYS

Oct. 29, 1957 C. G. SONTHEIMER 2,811,639

SIGNAL GENERATING APPARATUS

Filed May 26, 1953 2 Sheets-Sheet 2

INVENTOR:
CARL G. SONTHEIMER
BY
Curtis, Morris & Safford.
ATTORNEYS.

2,811,639

SIGNAL GENERATING APPARATUS

Carl G. Sontheimer, Riverside, Conn., assignor to C. G. S. Laboratories, Inc., Stamford, Conn., a corporation of Connecticut Application May 26, 1953, Serial No. 357,585

1 Claim. (Cl. 250—36)

This invention relates to electrical oscillators and more particularly to a system for stabilizing the frequency of the generated signal and which is particularly suitable for use with oscillators in which the frequency is variable over a substantial range.

Oscillators can be made to operate over wide frequency ranges without moving parts by the use of saturable reactor type devices having ferromagnetic ceramic cores. One such controllable inductor is described by Dewitz in U. S. patent application Serial No. 213,548, filed March 2, 1951.

Such oscillators tend to be unstable, in part because the core material, usually ferrite, of such controllable inductors is temperature sensitive. In addition, the generated frequency may vary with changes in the humidity, with the ageing of tubes or other parts, with changes in supply voltage, etc. Moreover, the hysteresis of the core material of the controllable inductor further interferes with precision control of the generated frequency. Thus, widely different frequencies may be generated with a given magnitude of control current depending upon the preceding magnetic history of the core.

The present invention is directed to the stabilization of the oscillator against changes in ambient conditions, ageing of parts, etc., and to the marked reduction or elimination of the effects of hysteresis of the core material of the controllable inductor by which the frequency of the oscillator is varied. In a preferred embodiment of the invention, the generated output signal is sampled and utilized to produce a voltage which is a monotonic function of the frequency. This voltage is then fed back as either a current or voltage signal and applied to control the oscillator circuit in such manner as to maintain the oscillator frequency constant despite changes in the ambient conditions and independently of the hysteresis effects of the core.

These and other aspects, advantages, and objects of the invention will be in part apparent from and in part pointed out in the following description of a preferred embodiment of the invention considered in conjunction with the following drawings, in which.

Figure 1:
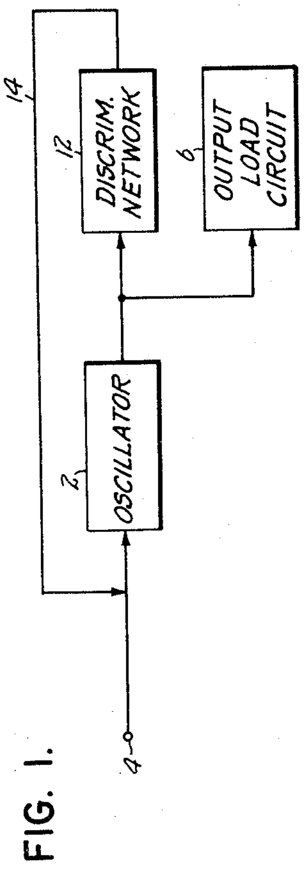
Figure 1 shows a block diagram for explaining the operating principles of the invention.

In the block diagram of Figure 1, an oscillator or signal generator 2, the frequency of which is controllable by the application of voltage or current at terminal 4, is coupled to an output load circuit 6. A small portion of the signal generator output is also fed to a network 12 capable of translating the signal into a direct voltage proportional to the frequency of the applied signal. The network 12 may be a conventional discriminator circuit. Such circuits can be made substantially independent of ambient conditions so that the signal applied to the lead 14 is a linear function of the frequency of the generator signal. The direct voltage signal on the lead 14 is applied to a controllable inductor to regulate the frequency of the oscillator.

In operation, if the output frequency of the signal generator tends to drift, for example due to a change in the room temperature, the frequency-responsive network of block 12 translates this incipient deviation into the form of a direct voltage or current which is applied to the control winding of the controllable inductor to produce the change necessary to maintain the frequency of the generated signal constant.

Figure 2:
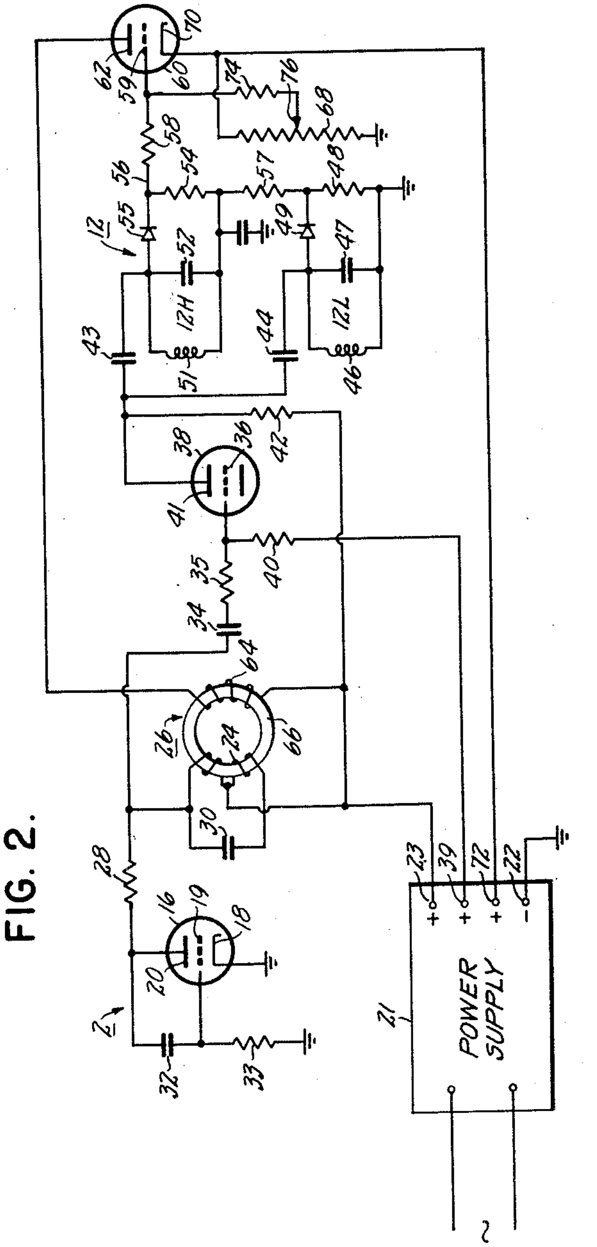
Figure 2 is a schematic diagram of an apparatus embodying the invention.
Figure 3:
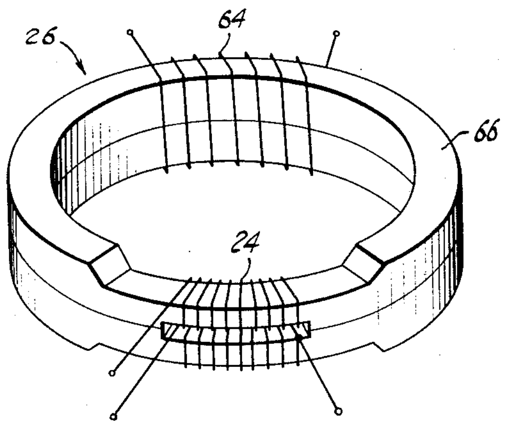
Figure 3 is a perspective view illustrating a controllable inductor suitable for use in the apparatus of Figures 1 and 2.

In Figure 2, the oscillator circuit 2 includes a vacuum tube 16 having a cathode 18, connected to the common ground circuit, a control grid 19, and an anode 20. Power for the oscillator is provided by a conventional type rectifier-filter power supply 21 having a negative voltage output terminal 22 which is connected to the common ground circuit, and a positive voltage terminal 23 connected through a signal winding 24 of a controllable inductor 26 and a resistor 28 to the anode 20.

The winding 24 is connected in parallel with a capacitor 30 to provide a frequency-selective tank circuit for determining the frequency of the oscillations. A feed-back signal from this tank circuit is coupled through a capacitor 32 to the grid 19 of the tube 16, a resistor 33 being connected between the control grid 19 and the common ground circuit in the usual manner. The output signal of the oscillator appearing at the junction of the resistor 28 and the winding 24 is coupled through a capacitor 34 and a suppressor resistor 35 to a control grid 36 of a limiter vacuum tube 38. This grid is biased positively from a low voltage terminal 39 of the power supply 21 to which it is connected through an isolation resistor 40. The anode 41 of this tube is connected through a load resistor 42 to the positive voltage supply terminal 23. The tube 38 is for the purpose of eliminating changes in amplitude of the signals from the oscillator 2; any desired type of limiter circuit can be used.

The constant-amplitude output signals appearing at the anode 41 of the limiter tube 38 are coupled to the two section, stagger-tuned discriminator circuit 12 through capacitors 43 and 44. The low frequency section 12L of the discriminator includes a parallel resonant circuit formed of an inductor 46 connected in parallel with a capacitor 47. One terminal of this capacitor 47 is connected to the common ground circuit and to a load resistor 48; the other terminal is connected through a half-wave rectifier 49 to the load resistor 48. The high-frequency section 12H of the discriminator includes a parallel resonant circuit formed of an inductor 51 connected in parallel with a capacitor 52. One terminal of this capacitor 52 is maintained at the potential of the ground circuit, so far as alternating currents are concerned, by a capacitor 53 and is connected to one end of a load resistor 54. The other terminal of the capacitor 52 is connected through a half-wave rectifier 55 to the other end of the load resistor 54 and to an output lead 56. The two load resistors 48 and 54 are connected in series through a resistor 57 so that the voltages appearing on the load resistors 48 and 54 are connected in series opposition so that the direct control voltage appearing on the lead 56 is the difference between these two voltages.

The discriminator sections 12H and 12L are tuned to resonant frequencies, respectively above and below a selected reference frequency corresponding to the midpoint in the frequency range of the oscillator 2. The construction of the discriminator is conventional and any other suitable discriminator arrangement can be used. The output lead 56 is connected through an isolation resistor 58 to a control grid 59 of a vacuum tube 60, so that the voltage thus applied to the grid 59 is a function of the frequency of the oscillator and increases with one polarity as the signal deviates from the center frequency of the discriminator in one direction; deviation in the opposite direction produces a control voltage of opposite polarity.

The anode 62 of this tube is connected through a control winding 64 on the controllable inductor 26 to the positive voltage supply terminal 23. The extent of magnetic saturation of the toroidal core 66 of the inductor 26 depends upon the magnitude of the current through the winding 64 and this magnetic saturation in turn determines the effective inductance of the winding 24 and thus the frequency of the signals generated by the oscillator 2.

In order to permit adjustment of the magnitude of the current through the winding 64 and the tube 60, a potentiometer 68 is arranged to permit manual control of the bias on the control grid 59. One terminal of the potentiometer is connected to the common ground circuit and the other terminal is connected to the cathode 70 of the tube 60 which is connected also to a terminal 72 of the power supply 21. The terminal 72 is positive with respect to ground but is at a lower potential than the terminal 39. The control grid 59 is connected through an isolation resistor 74 to the slidable contact 76 of the potentiometer 68 so that a negative bias voltage is applied to the control grid 59 relatively to the cathode 70, its value being dependent upon the setting of the slider 76. The voltage from the discriminator circuit 12 opposes or aids the bias voltage from the potentiometer 68 to provide the stabilizing control increment.

Tests with the preferred embodiment of Figure 2 have shown that a 5:1 variation in the capacitance of the capacitor 30, which without the control system would normally have altered the oscillator frequency by approximately 240%, resulted in a total frequency variation of less than 3%. Even better control characteristics can be achieved by providing a more complex limiting circuit and by providing for accurate regulation of the supply voltages.

If desired, the frequency of the oscillator can be controlled by the application of an external voltage to the control grid 59 of the tube 60.

The controllable inductor 26 preferably is of the type described by Dewitz in the above-identified patent application. The toroidal core 66 is of ferromagnetic ceramic material and is provided with a radially-extending slot through which the winding 24 is wound. This winding is divided into two halves which are wound through the slot and, respectively, around rim portions of the core on opposite sides of the slot. These two halves are connected in series and wound in opposite directions with respect to the circumferential flux in the toroid so that there is no significant mutual coupling between the windings.

From the foregoing, it will be apparent that the apparatus embodying the invention is well adapted for the attainment of the ends and objects hereinbefore set forth. The apparatus can be assembled readily from conventional components and is suitable for modification by those skilled in this field in order to adapt it to suit best the requirements of a particular use.

What is claimed is:

A frequency stabilized system comprising a variable-frequency signal generator including an electrically-controllable inductor having an annular core of ferrite material, a signal winding forming a frequency-controlling element of said generator, and a control winding on said ferrite core arranged to vary the magnetic saturation thereof, said core having a slot through the rim thereof, said signal winding being formed in two portions each extending through said slot and around opposite rim portions of said ferrite core adjacent said slot, an amplitude limiter circuit coupled to the output of said generator, a frequency-selective discriminator network coupled to the output of said limiter circuit and arranged to produce a control voltage whose value is a function of the frequency of the signals applied thereto from said generator, and means coupling said control voltage to said control winding thereby to vary the magnetic saturation of said core as a function of the relationship between the frequency of the signals from said generator and the frequency-selective characteristics of said discriminator.

References Cited in the file of this patent

UNITED STATES PATENTS

| | | |
|---|---|---|
| 2,302,893 | Van B. Roberts | Nov. 24, 1942 |
| 2,377,327 | Seeley | June 5, 1945 |
| 2,483,889 | De Groot | Oct. 4, 1949 |
| 2,595,931 | De Groot | May 6, 1952 |
| 2,685,001 | Darke, Jr. | July 27, 1954 |
| 2,708,219 | Carver | May 10, 1955 |

OTHER REFERENCES

J. S. Webb: article in I. R. E., vol. 26, No. 4, April 1938, pages 438–440.